No. 730,255. PATENTED JUNE 9, 1903.
D. GROTTA.
MACHINE FOR THREADING TAPE INTO EDGING.
APPLICATION FILED APR. 12, 1902.
NO MODEL. 2 SHEETS—SHEET 1.

WITNESSES:
J. C. Delaney.
Allan Foose.

INVENTOR
D. Grotta
BY
Duell, Megrath & Winfield
ATTORNEYS

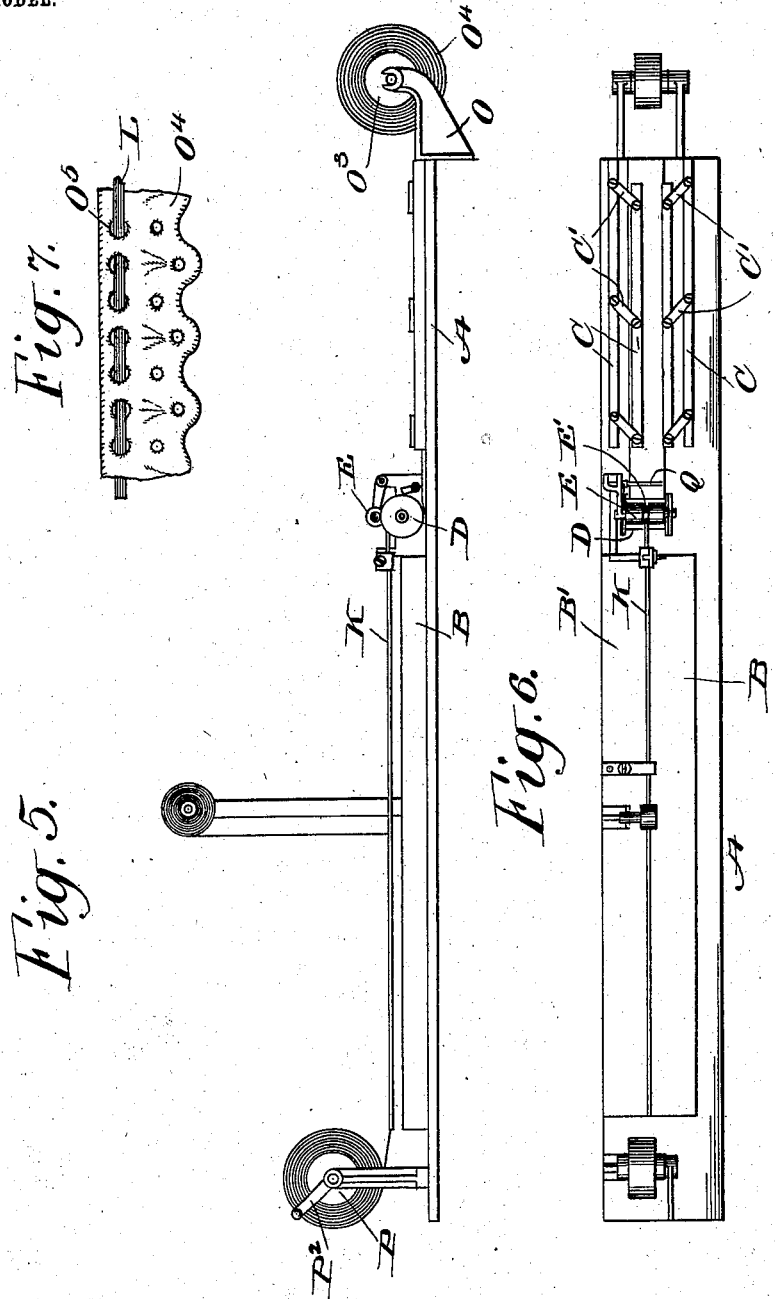

No. 730,255. Patented June 9, 1903.

UNITED STATES PATENT OFFICE.

DAVID GROTTA, OF NEWARK, NEW JERSEY, ASSIGNOR TO WEINGARTEN BROTHERS, OF NEW YORK, N. Y., A COPARTNERSHIP.

MACHINE FOR THREADING TAPE INTO EDGING.

SPECIFICATION forming part of Letters Patent No. 730,255, dated June 9, 1903.

Application filed April 12, 1902. Serial No. 102,553. (No model.)

*To all whom it may concern:*

Be it known that I, DAVID GROTTA, residing at Newark, in the county of Essex and State of New Jersey, have invented certain new and useful Improvements in Machines for Passing Ribbon Through Lace, of which the following is a full, clear, and exact description, such as will enable others skilled in the art to which it appertains to make and use the same.

My invention relates to machines for passing ribbon or tape through lace or edging to be used on wearing-apparel, especially corsets.

The present invention is an improvement on the machine invented by me and described in my prior application for patent, Serial No. 70,451, filed August 1, 1901, and relates especially to the spur or sprocket roller used to string the edging onto the needle by which the tape is inserted in the edging. In my prior machine the series of spurs were not adjustable. The spurs were so placed on the roller that one roller would operate only on pieces of edging having the opening therein spaced the same distance apart. When tape was to be inserted in edging having the openings differently spaced from those in a piece for which the roller was made, that roller would have to be substituted by another. In other words, it was necessary to have separate rollers with spurs thereon spaced to correspond with the openings in the edging. This was expensive and undesirable. Not only this, even when the spurs were spaced to correspond with a piece of edging having the openings spaced a certain distance apart good results could not be obtained, owing to the fact that the distances between the holes in a certain piece of edging would change by the edging being pulled and stretched.

It is the object of my present invention to overcome the objections existing in the prior machine. I accomplish this object by making a roller so that the spurs thereon may be adjusted to vary the distances between the spurs.

Other objects will appear from the following description, and the manner of accomplishing these objects will be clearly set forth in the specification.

The invention will be understood by those skilled in the art from the following specification, taken in connection with the accompanying drawings, forming a part thereof.

Figure 1:
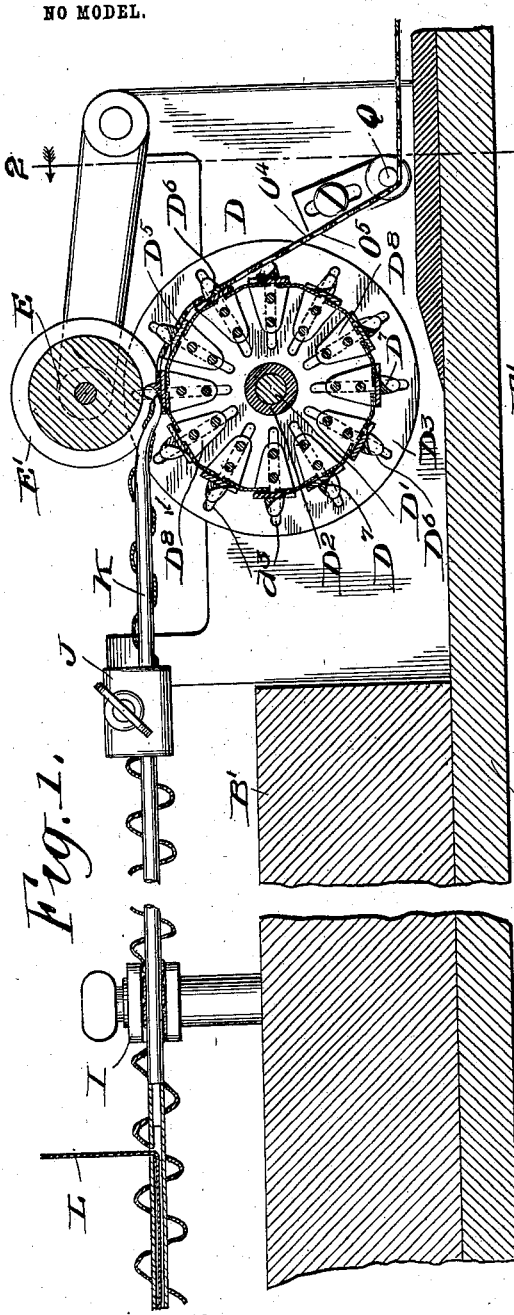
Figure 2:
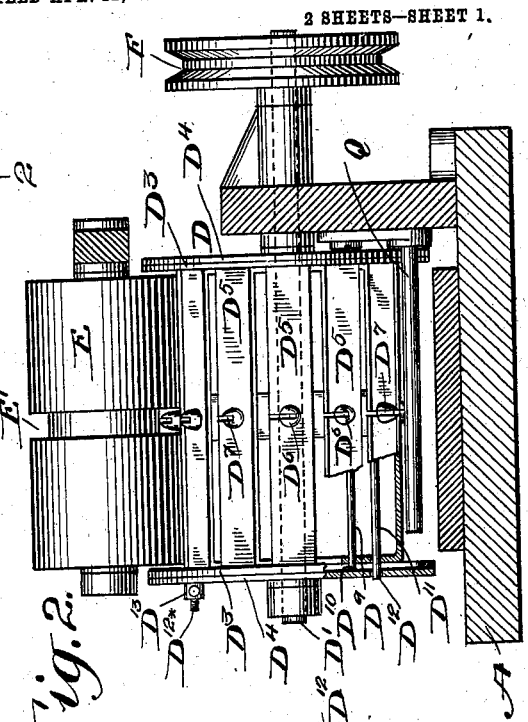
Figure 3:
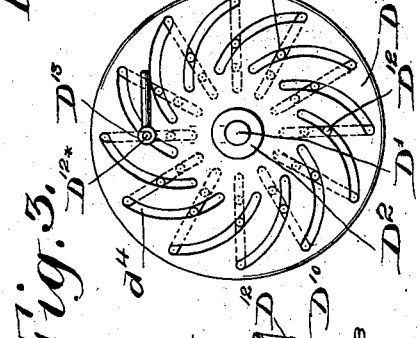
Figure 4:
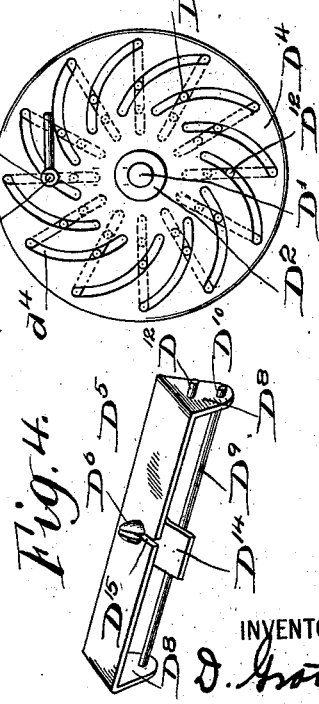

Referring now to the drawings, in which like letters of reference indicate the same parts in the different views, Figure 1 is a horizontal vertical broken section taken lengthwise of the machine. Fig. 2 is a vertical transverse section taken on line 2 in Fig. 1. Fig. 3 is an end view of the roller, showing the cam-plate for adjusting the plates carrying the spurs. Fig. 4 is a perspective view of one of the plate-carrying spurs. Fig. 5 is a side elevation of the machine on a smaller scale than shown in the prior figures. Fig. 6 is a plan view of Fig. 5; and Fig. 7 is a plan view of a piece of edging, showing the tape or ribbon passed therethrough.

In the drawings the part lettered A represents the bed of the machine, having raised guides B B' on each side thereof, between which the insertion or edging passes after it leaves the rollers. C represents the guides for guiding the edging before it enters the rollers, these guides being pivoted to links C', so that they may be adjusted for different widths of edging. D is the roller mounted on the bed of the machine. E is a guide-roll located above the roller D and journaled in the frame pivoted to a bracket on the machine. This roll is grooved at E', into which the spurs on the roller D enter. I and J are clamps to hold the needle K in proper position. At one end of the bed of the machine is attached the bracket O to support the spindles on the feed-roll $O^3$, which carries the insertion or edging $O^4$, having openings $O^5$, through which the tape L is to be inserted. P is a take-up roll journaled in brackets at the other end of the machine and which may be operated by a handle $P^2$. Q is an adjustable guide pin or roll adjacent to the roller D and under which the insertion passes before it is taken up by that roller. All of these parts except the roller D are substantially the same as those shown in my prior application.

The roller D, which consists of certain adjustable parts and which is the subject-matter of my present invention, will now be described.

D' is a shaft on which the roller is mounted.

$D^2$ is a sleeve loosely surrounding the shaft and having secured to each end thereof a disk $D^3$, which is provided with a series of radial slots $d^3$. On the outside of each of these disks $D^3$ is another disk, $D^4$, which is secured to the shaft $D'$. Each of these disks $D^4$ has a series of cam-shaped slots $d^4$ therein, as shown in Fig. 3 of the drawings.

$D^5$ represents a series of plates, on each of which is secured one of the spur-teeth $D^6$, which is slotted, so as to leave an incline or cam-surface $D^7$ at the bottom thereof. Each end of this plate is bent at right angles, as shown at $D^8$.

$D^9$ is a transverse rod extending across the plate $D^6$ and projecting through the ends $D^8$ thereof. Each of the ends $D^{10}$ of this rod extends just through the radial slots $d^3$. $D^{11}$ is another rod passing transversely across the plate and having the ends $D^{12}$ thereof projecting through the ends $D^8$ and are of such length that they will extend through the slots $d^3$ in the plate $D^3$ and through the slots $d^4$ in the disk $D^4$. These rods $D^9$ and $D^{11}$ are for the purpose of guiding the plates $D^5$ when the plates are to be moved in and out to adjust the spur-teeth. One of the rods $D^{11}$ has an end $D^{12}$ of such length as to project beyond the outer face of the disk $D^4$, and is screw-threaded to carry a clamp-nut $D^{13}$, used to clamp the disks $D^3$ and $D^4$ together, for the purpose to be hereinafter set forth.

$D^{14}$ is a tongue secured to the under side of the plate $D^5$ just under the spur $D^6$ to hold the needle in its operative position.

$D^{15}$ is a slot in the plate $D^5$, which registers with the slot in the spur $D^6$ and in which the needle is guided when the roller is in operation.

When the parts of the roller are assembled, as shown in the drawings, the distance between the spurs may be adjusted so as to cause the spurs to take into edgings having the holes therein at different distances apart by moving the outer disks $D^4$. When these disks are moved, which may be done by turning the shaft on which they are mounted, the cam-slots $d^4$ therein, operating against the ends $D^{12}$ of the rods $D^{11}$, will move the plates $D^5$ toward or from the center of the disk, depending upon the direction in which the disk is moved, and the plates will be guided by the rods $D^9$ and $D^{11}$ moving in the radial slots $d^3$. When the plates are moved out, it is apparent that the distance between the spurs will be increased and when they are moved in it will be decreased. When the spurs are set to their proper position, the clamp-nut $D^{13}$ is turned to clamp the two plates $D^3$ and $D^4$ together, so that they cannot be moved independently of each other, and the plates $D^5$ will then be held in their set position. When the shaft $D'$ is rotated to turn the roller $D$ in the direction of the arrow, which may be done by applying power to the pulley F on the end of the shaft, and the cam-surface $D^7$ of a spur comes under the end of the needle, it will raise this end so as to cause it to pass through one of the openings in the edging. As this spur passes from under the end of the needle the needle will drop and enter the next opening in the edging and rest upon the tongue $D^{14}$, carried by the next plate $D^5$. This tongue holds the end of the needle up, so that the needle will not fall between the plates $D^5$ when the plates have been moved out to such a distance from the center that their edges do not meet and form a continuous bearing-surface for the end of the needle between the spurs. As the needle rests on the tongue $D^{14}$, upon a continuous rotation of the roller the tongue will pass from under the end of the needle and the slot $D^{15}$ in the next plate will come under the end of the needle and guide it on the cam $D^7$ of the next spur $D^8$ and raise the needle up through the next opening in the insertion through which this second spur projects. It is understood, of course, that the slot $D^{15}$ is in such position in the plate $D^5$ so that it registers with the slot in the spur $D^6$, and it is on the same longitudinal plane as the needle. The continued rotation of the roller will cause the end of the needle to alternately pass up and down through the holes in the insertion and string the edging on the needle, so that the tape L is passed through the openings in the edging in the manner set forth in my prior application.

As the present invention relates solely to the roller and especially to the adjustable feature thereof, and as with this exception the machine operates the same as that described in my prior application, it is believed that no further description of the machine here illustrated needs to be set forth.

While I have shown a particular form of means for adjusting the distances between the spurs, yet it is to be understood that I do not limit myself to the construction here shown and described, as many changes and modifications may be made without departing from the spirit of my invention. As I am the first, so far as I know, to provide a roller for this class of machines with adjustable spur-teeth, so that it will not be necessary to change the rollers for every piece of insertion that may have openings therein spaced at a different distance from another piece, I am entitled to claim such feature broadly.

Having now described my invention, what I claim as new, and desire to secure by Letters Patent, is—

1. In a machine of the class described, a roller, said roller having a series of adjustable spurs thereon, and an adjustable needle in operative engagement with said spurs.

2. As an article of manufacture, a roller adapted to be used in a machine for passing tape through edging, said roller having a series of adjustable spurs thereon, said spurs being slotted and having an incline or cam-surface at the bottom of each slot as and for the purpose specified.

3. In a machine for passing tape through edging, a roller having a series of spurs thereon, means for moving the spurs toward and from the center of the roll so that the distances between the spurs may be decreased or increased as desired, a needle in successive engagement with said spurs, and means for adjusting the needle.

4. In a machine for passing tape through edging, a roller having a series of plates adapted to move radially from or toward the center, each plate having a spur whereby upon the moving of the plate the distance between the spurs will be varied.

5. In an apparatus of the class described, a shaft, a sleeve loosely journaled on said shaft, a disk secured to each end of the sleeve, having radial slots therein, another disk having cam-slots therein in operative engagement with each of the first-mentioned disks, a series of spurs between the first disks, and means connected to the spurs and extending into the said slots, whereby upon the movement of any one of the disks the spurs will be moved toward or from the center of the shaft to vary the distance between the spurs, as and for the purpose set forth.

6. In an apparatus of the class described, a shaft, a sleeve loosely mounted on said shaft, a disk at each end of the sleeve having radial slots therein, another disk on the outside of and in contact with the first-mentioned disk having cam-slots therein, a series of plates, each of which has a slotted spur thereon, rods passing transversely across the plate and into the slots in the disks whereby upon the movement of certain of the disks the plates will be moved toward or from the center of the sleeve whereby the distance between the spurs will be varied as and for the purpose set forth.

7. In a machine for passing tape through edging, a shaft, a sleeve loosely surrounding said shaft, a disk having a series of radial slots therein connected to each end of the sleeve, another disk on the outside of each of the first-mentioned disks having cam-slots therein, means carrying spurs projecting through the slots, spurs carried by said means, said spurs being slotted and a needle having its end thereof moving in said slots in the spurs as and for the purpose set forth.

8. In an apparatus of the class described, a shaft, a sleeve loosely mounted on said shaft, a disk at each end of the sleeve having radial slots therein, another disk in contact with the outer face of each of the first-mentioned disks having cam-slots therein, a series of plates extending between the first-mentioned disks and having rods carried thereby which project into the slots in the disks whereby upon moving one of the pairs of disks the plates will be moved toward or from the center of the disk, a spur carried by each of said plates and a tongue secured to each plate as and for the purpose set forth.

9. In an apparatus of the class described, a shaft, a sleeve loosely mounted on said shaft, a disk secured at each end of the sleeve, said disks having radial slots therein, another disk on the outside of each of the first-mentioned disks, said second disks being secured to the shaft and having cam-slots therein, a series of plates extending between the first-mentioned disks, a rod carried by each of said plates, the ends of which project into the radial slots of the first disks, a second rod carried by each of these plates, the ends of which project through the radial slots in the first-mentioned disks and into the cam-slots in the second disk whereby upon the moving of either of the disks the plates will be moved toward or from the center thereof, means for holding the plates together when they have been adjusted and spurs carried by each of the plates as and for the purpose set forth.

10. In an apparatus of the class described, a shaft, a sleeve loosely mounted on said shaft, a disk secured to each end of the sleeve, another disk adjacent to each of the first-mentioned disks and secured to the shaft, a device extending between the disks carrying spur-teeth, said device being so connected to the disks that upon the movement of either one of the disks the said device will be operated to vary the distance between the spurs carried thereby.

11. In an apparatus of the class described, a shaft, a sleeve loosely mounted on the shaft, a disk secured to each end of the shaft, another disk adjacent to each of the first-mentioned disks and secured to the shaft, one pair of the disks having radial slots therein and another having cam-shaped slots therein, a series of plates extending between the disks, pins carried by each of the plates and projecting into the slots in one pair of the disks, other pins carried by each of the plates and projecting through the slots in all of the disks whereby upon the movement one of the disks or plates will be moved toward or from the center of the disks, means for securing the disks together so that they may not be moved independently, a spur carried by each of the plates, and a tongue also carried by each of the plates and extending from that plate to another adjacent thereto as and for the purpose specified.

12. In an apparatus of the class described, a shaft, a sleeve loosely mounted on the shaft, a disk secured to each end of the shaft, another disk adjacent to each of the first-mentioned disks and secured to the shaft, one pair of the disks having radial slots therein and another having cam-shaped slots therein, a series of plates extending between the disks, pins carried by each of the plates and projecting into the slots in one pair of the disks, other pins carried by each of the plates and projecting through the slots in all of the disks whereby upon the movement one of the disks or plates will be moved toward or from the center of the disks, means for securing the disks together so that they may not be moved independently, a spur carried by each of the plates having a cam-slot therein, a tongue also carried by each of the plates and extending from that plate to another adjacent thereto and a needle having the end thereof adapted to contact with the cam-slots of the spurs whereby the needle will be alternately raised and lowered as and for the purpose set forth.

13. In an apparatus of the class described, a shaft, a sleeve loosely mounted on said shaft, a disk secured to each end of the sleeve, having radial slots therein, another disk adjacent to each one of the first-mentioned disks, having cam-slots therein, a series of devices carrying spurs extending between the first-mentioned disks and into the slots, spurs carried by said devices, the parts being so adapted and arranged that upon moving one of the disks the devices will be moved toward or from the center of the shaft, as and for the purpose set forth.

14. In a machine of the class described, a shaft, a sleeve loosely surrounding said shaft, a disk having a series of radial slots therein connected to each end of the shaft, another disk near each of the first-mentioned disks, said disk having cam-slots therein, a device carrying spurs extending between the first-mentioned disks and projecting through the slots in the said disks, spurs carried by said device, said spurs being slotted, and a needle having its end thereof in successive operative contact with the slots in the spurs, as and for the purpose set forth.

15. In a machine for inserting ribbon in lace, the combination with a needle, of a lace-feeding roll, and adjustably-arranged lace-feeding sprockets on said roll.

16. In a machine for inserting ribbon in lace, a needle, a lace-feeding roll, and lace-feeding sprockets adjustably arranged on said roll, the free end of each of the sprockets being provided with a slot, said slot being provided with a concave surface on which the end of the needle rides, as and for the purpose set forth.

17. In a machine for inserting ribbon in lace, the combination with a needle of an upper feed-roll having an annular groove, a lower feed-roll on which said upper feed-roll bears, and adjustably-arranged lace-feeding sprockets on said lower roll, extending into said annular groove in the upper roll for feeding the meshes of the lace on said needle.

18. In a machine for inserting ribbon in lace, a needle, an upper feed-roll having an annular groove, a lower feed-roll on which the upper feed-roll is adapted to bear, lace-feeding sprockets adjustably arranged on the lower roll, said sprockets extending into said annular groove in said upper roll for feeding the meshes of the lace upon the said needle, each sprocket having a slot in the free end thereof and provided with a concave surface on which the end of the needle rides.

19. In a machine for inserting ribbon in lace, the combination with a gathering-needle having a curved pick-up end, of a feed-roll having feeding-sprockets consisting of pins adjustably connected with said roll, each pin being provided with means for producing a vibratory motion of the pick-up end of the lace-gathering needle.

20. In a machine for inserting ribbon in lace, a gathering-needle having a curved pick-up end, and a feed-roll having feeding-sprockets consisting of pins adjustably connected with said roll, each pin being provided with means for producing a vibratory motion of the pick-up end of the lace-gathering needle consisting of a slot in the free end of each of said pins and a concave surface at the bottom of each slot, as and for the purpose specified.

In testimony whereof I affix my signature in the presence of two witnesses.

DAVID GROTTA.

Witnesses:
W. S. KILLBY,
C. MARSH.